Jan. 15, 1963  E. J. WEINFURT  3,074,010
VOLTAGE REGULATING APPARATUS
Filed June 17, 1959  3 Sheets-Sheet 1

INVENTOR.
Edward J. Weinfurt
BY
Lee H. Kaiser
Attorney

Jan. 15, 1963  E. J. WEINFURT  3,074,010
VOLTAGE REGULATING APPARATUS
Filed June 17, 1959  3 Sheets-Sheet 2

INVENTOR.
Edward J. Weinfurt
BY
Lee H. Kaiser
Attorney

Jan. 15, 1963   E. J. WEINFURT   3,074,010
VOLTAGE REGULATING APPARATUS
Filed June 17, 1959   3 Sheets-Sheet 3

INVENTOR.
Edward J. Weinfurt
BY Lee W. Kaiser
Attorney

United States Patent Office 3,074,010
Patented Jan. 15, 1963

3,074,010
VOLTAGE REGULATING APPARATUS
Edward J. Weinfurt, Glendale, Mo., assignor to McGraw-Edison Company, Milwaukee, Wis., a corporation of Delaware
Filed June 17, 1959, Ser. No. 821,003
27 Claims. (Cl. 323—66)

This invention relates to voltage regulating apparatus for alternating current power systems and in particular to voltage regulating apparatus of the electromagnetic motor type adapted to supply energy and to also control the direction of energy delivery in accordance with variations of voltage above and below a predetermined value.

It is an object of the invention to provide voltage regulating apparatus of the electromagnetic motor type having novel means to adjust the voltage bandwidth within which the power system voltage is maintained.

Another object of the invention is to provide voltage sensitive control apparatus of the electromagnetic vibratory pump type having novel energy take-off means.

It is a further object of the invention to provide voltage sensitive control apparatus of the electromagnetic vibratory pump type adapted to integrate departures of power system voltage from a nominal value with respect to both time and the magnitude of the departure.

Another object of the invention is to provide a voltage sensitive control apparatus of the electromagnetic vibratory pump type having novel means to compensate for changes in wire resistance, permeability of steel, and viscosity of liquid resulting from temperature variation.

Still another object of the invention is to provide a voltage sensitive control of the electromagnetic vibratory pump type having novel means to adjust the volume of liquid delivered by the pump and the time delay in operating the electrical switching means.

A still further object of the invention is to provide voltage sensitive control apparatus including a work cylinder and an electromagnetic vibratory pump adapted to deliver liquid into opposite ends of the work cylinder in accordance with variations in voltage above and below a nominal value and having novel means to bias the piston to a central position within the work cylinder and to displace the piston from said central position in proportion to, and in the direction of, the departure of said voltage from said nominal value.

A still further object of the invention is to provide unitary, compact, voltage sensitive control apparatus adapted to continuously operate with a minimum of input energy and to deliver sufficient energy to operate the electrical switching means of voltage regulating apparatus and to control the direction of energy delivery to the voltage regulating apparatus.

Another object of the invention is to provide voltage sensitive control apparatus of the electromagnetic vibratory pump type including a work cylinder housing novel means to convert displacement of the work cylinder piston into rotation of an output shaft.

These and other objects and advantages of the invention will be more readily apparent from the following detailed description when taken in conjunction with the accompanying drawing wherein.

Figure 2:
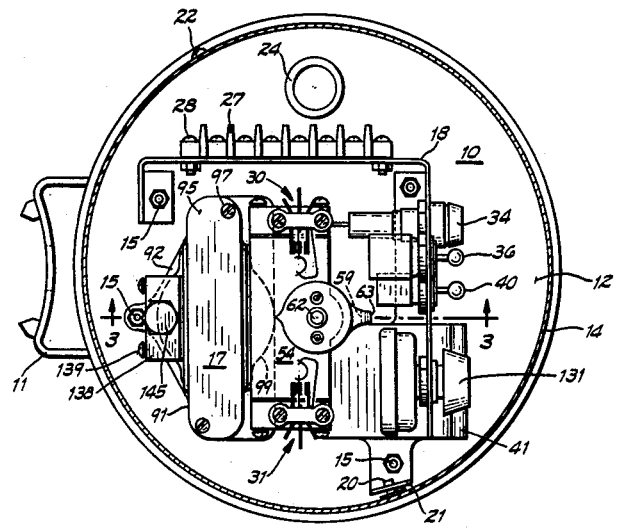
FIG. 2 is a horizontal sectional view of the apparatus of FIG. 1 taken below the uppermost portion of the cover.

Referring to the drawing, the invention will be described as embodied in voltage sensitive control apparatus such as a contact making voltmeter 10 mounted on a metallic support bracket 11 adapted to be secured to a power line pole. The voltage sensitive control 10 is enclosed in a suitable weatherproof casing including a metallic base plate 12 secured by suitable means such as welding to support bracket 11 and a dome-shaped cover 14. Upwardly extending bolts 15 welded to base plate 12 permit mounting of an electromagnetic vibratory alternating current pump 17 and a metallic panel 18 rigidly on base plate 12. Cover 14 is secured to base plate 12 by a stud 20 extending inwardly from the inner periphery of cover 14 and fitting within a horizontally extending aperture in an upwardly extending portion 21 of panel 18 and a screw 22 diametrically opposite therefrom protruding through registering holes in cover 14 and base plate 12. Conductors leading to the voltage sensitive control 10 pass through a strain-relief bushing 24 fitting within a hole in base plate 12 and are secured to a terminal strip 27 affixed to panel 18 by bolts 28.

The voltage sensitive control 10 is adapted to control voltage regulating apparatus such as a shunt capacitor bank 29 (see FIG. 12) or a transformer tap changer (not shown) to maintain the voltage of an alternating current power system 200 within predetermined voltage bandwidth limits. Power system 200 is illustrated as including a transformer provided with a primary 207 connected to a power line 208 and a secondary 209 connected to a load line 210. The voltage sensitive control 10 is adapted to close a first set of normally open Raise electrical contacts 30 (see FIG. 12) when the power system voltage is beyond one bandwidth limit to typically complete an energizing circuit the close coil 201 of a circuit breaker 203 adapted to switch shunt capacitor bank 209 onto and off the power line 208 or to the winding of a reversible capacitor-type motor (not shown) adapted to actuate the movable contacts of a transformer tap changer between tap positions. The voltage sensitive control 10 is also adapted to close a second set of normally open Lower contacts 31 when the power system voltage is beyond the other bandwidth limit to complete an operating circuit to the trip coil 204 of the circuit breaker for the shunt capacitor bank 29 or to the other winding of the reversible transformer tap changer motor (not shown). The energizing coil 101 of the electromagnetic voltage sensitive pump 17 is connected by conductors 112 and 113 across the secondary or load line 210, and the close coil 201 and trip coil 204 of the circuit breaker 203 are also energized from the load line 210. The circuit through the Raise and Lower contacts is from one side of the alternating current load line 210 of power system 200 over conductor 33, a fuse 34 mounted on panel 18, conductor 35, a single-pole Manual Test—Automatic toggle switch 36 mounted on panel 18, and thence through the Raise contacts 30 and conductor 37 to the close coil 201 of the shunt capacitor bank circuit breaker 203 and to the other side of the alternating current load line 210, or through the Lower contacts 31 and conductor 38 to the trip coil 204 of the shunt capacitor bank circuit breaker 203. Toggle switch 36 is normally in the closed Automatic position, but operation of toggle switch 36 to the open Manual Test position disconnects the lower contacts 31 and Raise contacts 30 from the power system and permits the shunt capacitor bank 29 to be manually connected to and disconnected from the power system 200 by operation of a toggle switch 40 mounted on panel 18 to the Raise or Lower position which connects conductor 35 directly to conductor 37 or conductor 38 and thus connects the alternating current source of power directly to the close coil 201 or to the trip coil 204 of the circuit breaker 203 for the shunt capacitor bank 29. A counter 41 mounted on panel 18 and electrically connected by conductor 42 to conductor 39 is operated every time the Lower contacts 31 are closed and thus records the number of operations of the voltage sensitive control 10.

Normally open Raise contacts 30 preferably comprise a snap acting switch including a pair of elongated, metallic, spring contact members 44 and 45 embedded in spaced apart relation in an insulating member 46 preferably of suitable plastic and having extending terminals adapted to be soldered to electrical conductors. A C-spring 48 for snapping the switch between open and closed positions is secured to the end of spring contact 44 and to the end of inverted L-shaped member 49 having the opposite end embedded in plastic member 46. Spring contact 44, C-spring 48, and inverted L-shaped member 49 constitute an overcenter actuating means for snapping spring contact members 44 and 45 between the open, or "break" position shown in FIG. 10 and the closed, or "make" position. Insulating member 46 is secured by screws 51 to the end plate 52 of a work cylinder 54. Normally open Lower contacts 31 comprise a snap acting switch identical to Raise contacts 30 and the description will not be repeated. Lower contacts 31 include a pair of elongated metallic spring contact members 55 and 56 rigidly embedded in an insulating member 46 which is secured by screws 51 to an end plate 58 on the opposite end of work cylinder 54.

Figure 3:
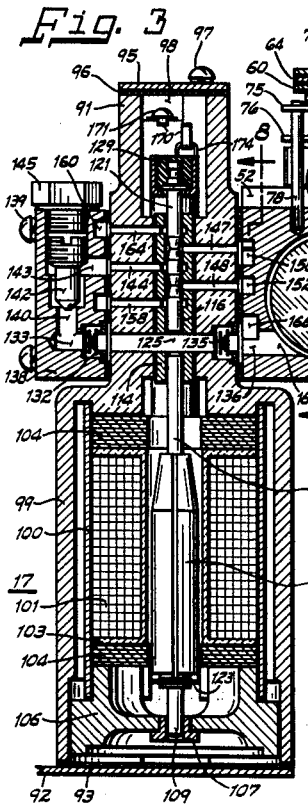
FIG. 3 is a vertical sectional view through the electromagnetic vibratory pump of the apparatus of FIG. 1.
Figure 10:
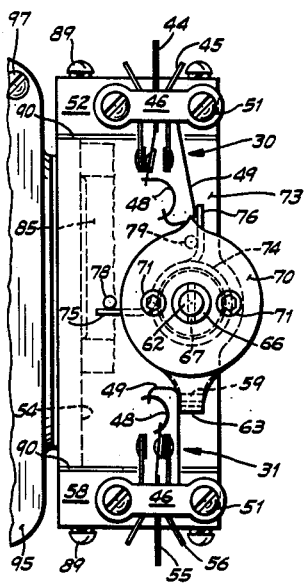
FIG. 10 is a plan view of the work cylinder showing the electrical switching means mounted thereon.
Figure 11:
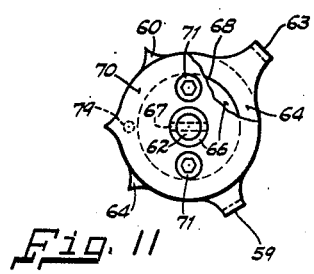
FIG. 11 is a fragmentary plan view of the voltage bandwidth adjusting means.

Lower contacts 31 are adapted to be operated by a depending arm 59 on an annular bandwidth adjusting lever 60 secured to a vertical shaft 62, and Raise contacts 30 are adapted to be operated by a depending arm 63 on a similar annular bandwidth adjusting lever 64 affixed to shaft 62. As illustrated in FIGS. 3 and 10 both arms 59 and 63 are in the same radial plane and both simultaneously engage and operate the Lower contacts 31 when shaft 62 is rotated in the clockwise direction and both simultaneously engage and operate the Raise contacts 30 when shaft 62 is rotated in the counterclockwise direction. However, when arms 59 and 63 are in different radial planes as illustrated in FIG. 11, arm 59 is adapted to operate Lower contact 31 and arm 63 is adapted to operate Raise contacts 30 and the apparatus will be so described hereinafter. A bandwidth adjusting plate 66 is secured to vertical shaft 62 by a pin 67. Bandwidth adjusting plate 66 has a reduced diameter circular portion 68 surrounded by the annular bandwidth adjusting levers 60 and 64. A bandwidth adjusting clamping plate 70 positioned above the annular bandwidth adjusting levers 60 and 64 secured to the bandwidth adjusting plate 66 by screws 71 clamps the bandwidth adjusting levers 60 and 64 against the bandwidth adjusting plate 66. Shaft 62 is rotatably journaled in a spring support stud 72 threadably secured to the casing 73 of work cylinder 54.

A double-acting torsion spring 74 surrounding the upper end of spring support stud 72 has radially outward extending ends 75 and 76 disposed on opposite sides of an upwardly extending stop pin 78 rigidly secured to work cylinder casing 73 and also disposed on opposite sides of a depending pin 79 rigidly affixed to bandwidth adjusting plate 66. As will be seen in FIG. 10, rotation of shaft 62 and bandwidth adjusting plate 66 secured thereto in a clockwise direction as seen in plan view will cause one end 75 of double-acting torsion spring 74 to abut against stop pin 78, and depending pin 79 on bandwidth adjusting plate 66 will deflect the other end 76 of double-acting torsion spring 74 to load the spring 74 and bias it to return pin 79 and bandwidth adjusting plate 66 to the starting position. Similarly rotation of shaft 62 and bandwidth adjusting plate 66 in a counterclockwise direction will cause end 76 of double-acting torsion spring 74 to abut against stop pin 78, and depending pin 79 on bandwidth adjusting plate 66 will deflect end 75 of double-acting torsion spring 74 to load spring 74 and bias it to return pin 79 and bandwidth adjusting plate 66 to the initial positions. It will thus be seen that shaft 62 and bandwidth adjusting plate 66 are biased by double-acting torsion spring 74 in a "neutral" position and that bandwidth adjusting plate 66 and depending bandwidth adjusting lever arm 63 carried thereby must be rotated through a predetermined angle from the neutral position in a counterclockwise direction to permit arm 63 to actuate inverted L-shaped member 49 and thus snap spring contacts 44 and 45 of Raise contacts 30 into closed, or, "make" position to complete an energizing circuit to the close coil 201 of the circuit breaker 203 of the shunt capacitor bank 29. Similarly depending bandwidth adjusting lever arm 59 and plate 66 must be rotated through a predetermined angle from the neutral position in the closkwise direction to permit arm 59 to actuate the inverted L-shaped member 49 of Lower contacts 31 to closed, or "make" position to complete an energizing circuit to the trip coil 204 of the shunt capacitor bank circuit 203.

As shown in FIGS. 3 and 10, the bandwidth adjusting lever 64 is of greater diameter than the bandwidth adjusting lever 60 and the depending arms 59 and 63 are in the same radial plane, thereby requiring approximately ninety degree rotation of bandwidth adjusting plate 66 and shaft 62 to operate Raise contacts 30 or Lower contacts 31. However, bandwidth adjusting levers 60 and 64 can be adjustably mounted at different angular positions on plate 66 by means of clamping plate 70 and screws 71, and consequently the levers 60 and 64 may be adjustably secured in any desired angular relation relative to bandwidth adjusting plate 66 and thus relative to the contacts 31 or 30 which they operate. As illustrated in FIG. 11, bandwidth adjusting lever 60 is secured to plate 66 in a position removed approximately sixty degrees from the position in which it is illustrated in FIGS. 3 and 10, thereby requring only approximately thirty degree rotation of shaft 62 and bandwidth adjusting plate 66 from the neutral position to actuate the Lower contacts 31 to closed position. Further, as illustrated in FIG. 11, bandwidth adjusting lever 64 is secured to plate 66 in a position removed approximately forty-five degrees from the position in which it is illustrated in FIGS. 3 and 10, thereby requring only approximately forty-five degrees rotation of shaft 62 and bandwidth adjusting plate 66 from the neutral position to actuate the Raise contacts 30 to closed position. It will be appreciated that bandwidth adjusting levers 60 and 64 can be secured so that any desired rotation of shaft 62, i.e., from approximately five degrees to ninety degrees, from the neutral position can be required to operate Lower contacts 31 and Raise contacts 30. As explained hereinafter, rotation of shaft 62 from the neutral position is proportional to the departure of the power system voltage from the nominal value at the middle of the voltage bandwidth, and consequently the voltage bandwidth can be easily adjusted by suitably positioning levers 60 and 64 on plate 66 so that any desired rotation of shaft 62, and thus any desired departure of the voltage from a nominal value, will operate Lower contacts 31 or Raise contacts 30. Inasmuch as Raise contacts 30 and Lower contacts 31 control the voltage regulating means, i.e., the shunt capacitor bank 29, it will be appreciated from the following description that the hereinbefore disclosed means permits adjustment of the magnitude of the departure of voltage from the nominal value required to operate the voltage regulating means and thus raise or lower the voltage of the power system.

Figure 7:
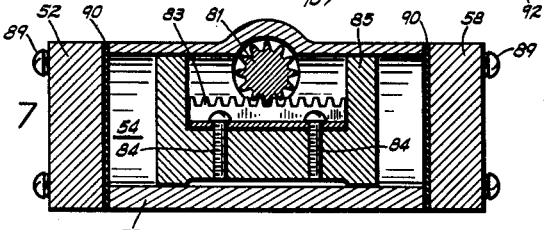
FIG. 7 is a sectional view taken along line 7—7 of FIG. 6.

Shaft 62 is rigidly affixed to a pinion 81 disposed within a cylindrical bore, or work cylinder, 54 in work cylinder casing 73 and meshing with a rack 83 secured within work cylinder 54 by screws 84 to the midportion of a double-ended piston 85 reciprocable within the cylinder 54. The lower end of shaft 62 is rotably journalled within a recess 86 (See FIG. 3) in work cylinder casing 73 extending upwardly into work cylinder 54, and a felt washer 88 surrounding shaft 62 and fitting within a circular recess in spring support stud 72 prevents leakage of liquid upwardly along shaft 62. Screws 89 securing end plates 52 and 58 to work cylinder casing 73 with gaskets 90 clamped therebetween seal the work cylinder 54 against leakage of liquid. As explained hereinafter, liquid is pumped into the left end of cylindrical bore 54 as seen in FIG. 7 to actuate double-ended piston 85 and rack 83 to the right and thus rotate shaft 62 and bandwidth adjusting lever arm 63 counterclockwise as seen from above to close Raise contacts 30; similarly liquid is pumped into the right end of cylindrical bore 54 to actuate double-ended piston 85 and rack 83 to the left as seen in FIG. 7 and thus rotate shaft 62 and bandwidth adjusting lever arm 59 clockwise to operate the Lower contacts 31. It will be apparent that torsion spring 74 will bias piston 85 in a central position within work cylinder 54 coresponding to the initial position of shaft 62 and will oppose displacement of piston 85 from the central position with a force proportional to the distance displaced.

Figure 12:
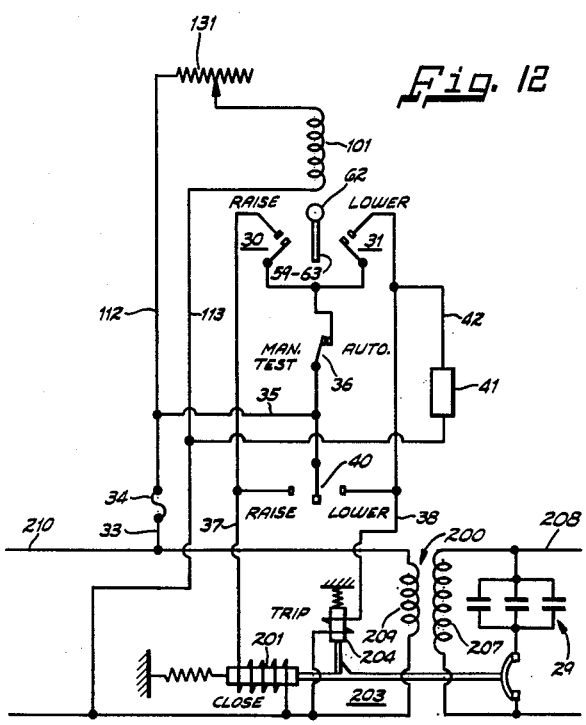
FIG. 12 is a schematic circuit diagram of an alternating current power system embodying voltage regulating means and the voltage sensitive control apparatus of FIG. 1.

Vibratory alternating current electromagnetic pump 17 not only delivers liquid under pressure for operating work cylinder 54 but it also selectively controls which end of work cylinder 54 the fluid under pressure is delivered into in accordance with variations in the voltage of the load line 210 above and below a predetermined nominal value at the midpoint of the voltage bandwidth. Pump 17 includes a hollow housing 91 preferably of nonmagnetic metallic material such as aluminum sealed at its lower end by a housing bottom member 92 and a gasket 93 and sealed at its upper end by a housing cover 95 and a gasket 96 and secured to housing 91 by screws 97. A suitable liquid 98 fills the sealed hollow housing 91. Housing 91 is approximately rectangular with arcuate wall portions 99 at the lower central portion thereof defining an approximately cylindrical enclosure for an electromagnet. The electromagnetic field structure includes a tubular outer shell 100 of suitable electromagnet material such as steel surrounding a cylindrical electrical winding 101 wound on an insulating spool 103. The field structure, or pole structure, also includes a plurality of annular silicon steel laminations 104 disposed above winding 101 and fitting within outer steel shell 100 and a plurality of such annular silicon steel laminations 104 disposed below winding 101 and within outer steel shell 100. Outer shell 100 and the steel laminations 104 positioned below winding 101 rest upon a circular bearing assembly 106 preferably of suitable nonmagnetic material such as aluminum. A plunger guide bearing 107 pressed within an axial aperture in bearing assembly 106 slidably receives a plunger guide pin 109 affixed to the end of a plunger, or armature, 110 which is magnetically suspended within the electromagnetic pole structure when an alternating current voltage from the power system 200 is impressed on winding 101 over conductors 112 and 113 as shown in FIG. 12.

As explained hereinafter, armature 110 is adapted to vibrate rapidly in a longitudinal direction in accordance with the cyclic pulsations of the magnetic flux in the pole structure.

A tubular bushing 114 pressed into a vertical aperture in the upper portion of pump housing 91 is formed with a vertical bore, or cylinder, 116 coaxial with plunger 110. Three axially spaced apart circumferential grooves 117 (see FIG. 9) are formed in the inner periphery of bushing 114 and cylinder 116. A pumping piston rod 120 affixed rigidly to the upper end of armature 110 is adapted to reciprocate within the lower end of cylinder 116. A valving piston rod 121 is adapted to reciprocate in the upper end of cylinder 116. Piston rod 120 and valving piston rod 121 constitute opposing piston rods within cylinder 116 defining a pumping chamber 125 therebetween.

Piston rod 120 and valve rod 121 are resiliently connected together, and a weight of sufficient mass is secured to valve rod 121 to prevent it from vibrating with armature 110 and piston rod 120. The midportion of a thin, flexible, leaf spring 123 is secured to the lower end of armature 110 by plunger guide pin 109. The ends of flexible, resonant, leaf spring 123 are secured to the vertical legs 124 of a U-shaped weight member 126 disposed within pump housing 91 and having sufficient mass to prevent valve rod 121 from vibrating with armature 110. The upper end of valve rod 121 extends through a clearance aperture in the cross piece 127 of the U-shaped weight member 126 and is secured to the cross piece 127 by a retaining ring 128 fitting within a circumferential groove in valving piston rod 121 and by a suitable sealing cement 129 filling the aperture 130 in the cross-piece 127 into which the valving piston rod 121 extends.

The armature 110, piston rod 120, leaf spring 123, weight member 126, and valving piston rod 121 constitute a unitary assembly magnetically suspended within the electromagnetic pole structure when winding 101 is energized from the alternating current load line 210 over conductors 112 and 113. This magnetically suspended assembly is adapted to assume a mean, or neutral, position determined by a predetermined nominal magnitude of voltage impressed on winding 101, which nominal voltage is at the middle of the voltage bandwidth. The magnetically suspended assembly is adapted to occupy positions above and below the neutral position in accordance with variations in the voltage of load line 210 impressed on winding 101 above and below the predetermined nominal value and to remain sustantially stationary while the armature 110 continues to vibrate. The stroke of armature 110 and piston rod 120 is minute and only a minute quantity of liquid is pumped at each stroke, but the strokes occur in rapid succession and an amply sufficient volume of liquid is pumped to displace the work cylinder piston 85.

A rheostat 131 mounted on panel 18 and connected in series with winding 101 permits adjustment of nominal voltage at the midpoint of the voltage bandwidth.

Piston rod 120 vibrates towards and away from stationary valving piston rod 121 and on the upstroke forces fluid under pressure out of the pumping chamber 125 through an outlet check valve 132 into an outlet passage 133 registering with pumping chamber 125. On the downstroke of piston rod 120, outlet valve 132 closes and a partial vacuum is created in the pumping chamber 125, thereby causing an inlet check valve 135 to open and permit flow of liquid into pumping chamber 125 from an inlet passage 136 registering with cylinder 116 between piston rod 120 and valving piston rod 121.

Outlet passage 133 is formed in a valve body cover assembly 138 secured to pump housing 91 by screws 139. Outlet passage 133 includes a vertical portion 140 having a needle valve 142 therein and an upper horizontal portion comprising a horizontal opening 143 in valve body 138 communicating with a horizontal opening 144 in pump housing 91 registering with cylinder 116. Needle valve 142 is accessible through a plug 145 threaded within a tapped aperture in valve body cover assembly 138 and may be readily adjusted by a screw driver to control the volume of fluid from the electromagnetic vibratory pump delivered to the work cylinder 54. Reducing the volume of liquid delivered to the work cylinder provides a more retarded action, or time delay, in moving work cylinder piston 85 from its central position within work cylinder 54 to a position wherein Raise contacts 30 or Lower contacts 31 are operated, thereby providing adjustment in the time delay between the instant the voltage of the load line 210 is beyond the bandwidth limits and the shunt capacitor bank 29 is switched onto or off the power line 208.

Figure 6:
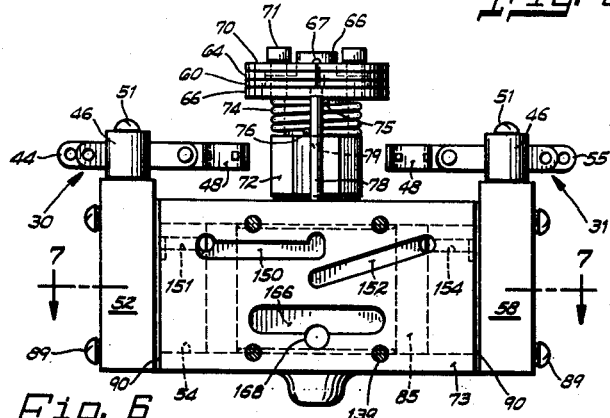
FIG. 6 is a view of the work cylinder looking toward the surface which abuts against the pump housing.

The valving piston rod 121 is adapted to selectively control the flow of liquid from the outlet passage 133 into delivery passages leading to opposite ends of the work cylinder in accordance with variations in voltage above and below the nominal value as will now be explained. The horizontal opening 144 of outlet passage 133 registers with cylinder 116 at a circumferential groove 117 which is between the axially spaced apart points where two horizontal delivery passages 147 and 148 in pump housing 91 register with vertical cylinder 116. Delivery passage 147 registers a generally horizontal slot 150 transverse to delivery passage 147 and formed in the exterior periphery of work cylinder casing 73 (see FIG. 6) and which, in turn, registers with a generally horizontal opening 151 in casing 73 communicating with the left end of work cylinder 54 as shown in FIG. 6. The delivery passage between cylinder 116 and the left end of work cylinder 54 thus includes the openings 147, 150 and 151. Delivery passage 148 in pump housing 91 registers with a generally horizontal slot 152 transverse to delivery passage 148 and formed in the exterior surface of work cylinder casing 73 (see FIG. 6) and which, in turn, registers with a generally horizontal opening 154 in casing 73 communicating with the right end of work cylinder 54 as shown in FIG. 6. The delivery passage between cylinder 116 and the right end of work cylinder 54 thus includes the openings 148, 152 and 154.

Figure 4:
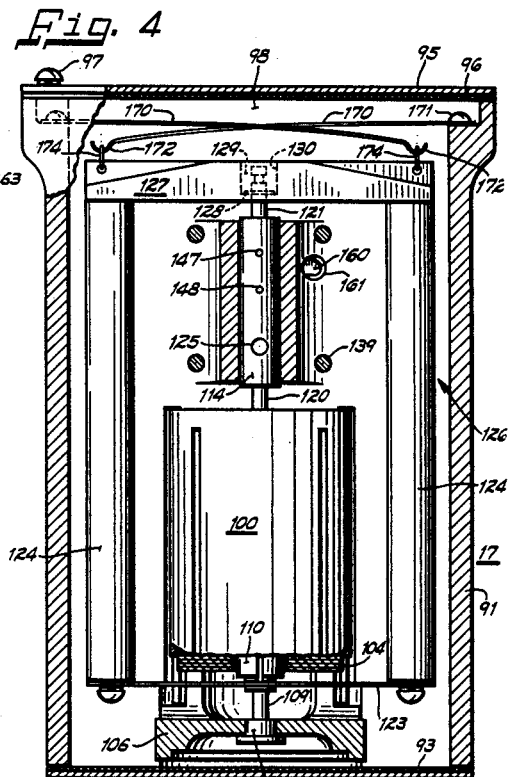
FIG. 4 is a sectional view taken along line 4—4 of FIG. 1.
Figure 5:
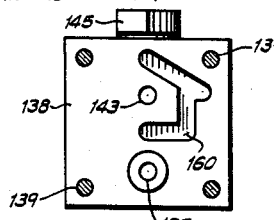
FIG. 5 is a view of the outlet valve body looking toward the surface which abuts against the pump housing.

Valving piston rod 121 includes an increased diameter portion, or valve, 155 which selectively directs the fluid from the pump outlet passage 133 into delivery passages 147 or 148 depending upon whether the voltage impressed upon winding 101 is above or below the nominal value at the midpoint of the voltage bandwidth. If the voltage of the load line 210 impressed on winding 101 is at the nominal value at the midpoint of the voltage bandwidth, increased diameter valve portion 155 is symmetrically disposed relative to delivery passages 147 and 148 and equal volumes of liquid under pressure are delivered to both ends of the work cylinder 54 and consequently no displacement of piston 85 occurs. If the power system voltage impressed on winding 101 is below the nominal value, the magnetically suspended assembly and valving rod position are below the neutral position, and valve 155 directs fluid from pump outlet passage 133 into delivery passage 147 and into the left end of the work cylinder 54, thereby causing double-ended piston 85 and rack 83 to move the right and rotating shaft 62 and lever arm 63 in a counterclockwise direction. As the piston moves to the right, liquid 98 is exhausted from the right end of work cylinder 54 and returns through openings 154 and 152 and delivery passage 148 into cylinder 116. An increased diameter valving portion, or valve, 157 on the lower end of valving rod 121 directs the fluid exhausting from delivery passage 148 into a horizontal exhaust passage 158 in pump housing 91 from whence it flows upwardly through a generally U-shaped exhaust slot 160 (see FIG. 5) in the surface of valve body cover assembly 138 abutting against pump housing 91 and returns through an aperture 161 (see FIG. 4) in the wall of pump housing into the reservoir of liquid 98 within pump housing 91.

Figure 9:
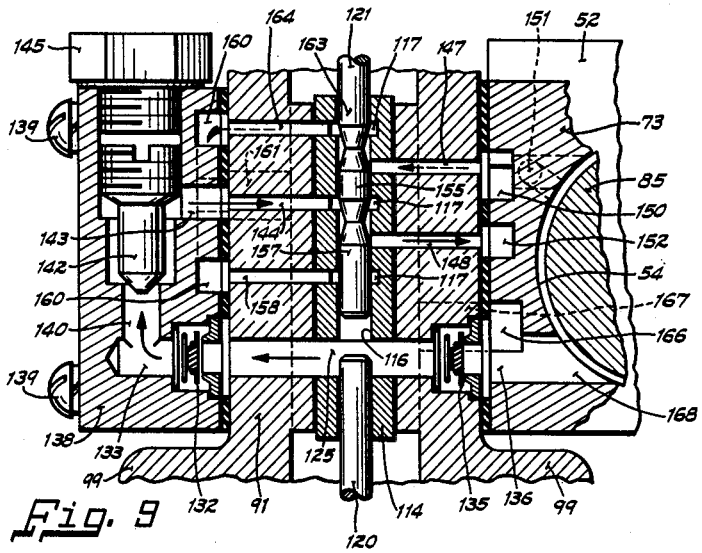
FIG. 9 is an enlarged vertical sectional view through the pumping chamber and valving means of the electromagnetic pump.

FIG. 9 illustrates the condition when the load line voltage impressed on winding 101 is above the nominal value at the center of the bandwidth and the magnetically suspended assembly including valving piston rod 121 is raised above the neutral position and directs the liquid (shown by solid arrows as flowing through outlet passage 133 including openings 140, 143, and 144) into delivery passage 148 from whence it flows through openings 152 and 154 to the right hand end of work cylinder 54 and actuates double-ended piston 85 and rack 83 to the left to rotate shaft 62 and depending lever arm 59 in the clockwise direction to operater Lower contacts 31. Liquid exhausting from the left end of work cylinder 54 returns through openings 151 and 150 and delivery passage 147 as shown by the dotted arrow into cylinder 116 from whence it is directed by increased diameter valving portion 163 on valving piston rod 121 into an exhaust passage 164 in pump housing 91 (as shown by the dotted arrow) which communicates with U-shaped exhaust slot 160 and is returned through aperture 161 to the liquid reservoir in pump housing 91.

Figure 8:
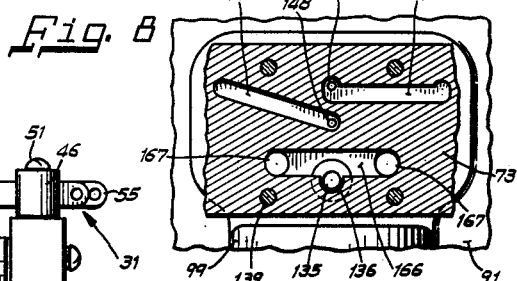
FIG. 8 is a sectional view taken along line 8—8 of FIG. 3.

Inlet passage 136 in pump housing 91 communicates with an elongated horizontal slot 166 in the exterior surface of work cylinder casing 73 facing pump housing 91, and slot 166 at its ends registers with two holes 167 (see FIG. 8) through the wall of pump housing 91 to thus connect inlet passage 136 to the liquid reservoir within hollow pump housing 91. A horizontal aperture 168 in work cylinder casing 73 coaxial with inlet passage 136 connects the reservoir within hollow housing 91 and inlet passage 136 to the surface of work cylinder 54 between the end walls of double-ended work cylinder piston 85.

Figure 1:
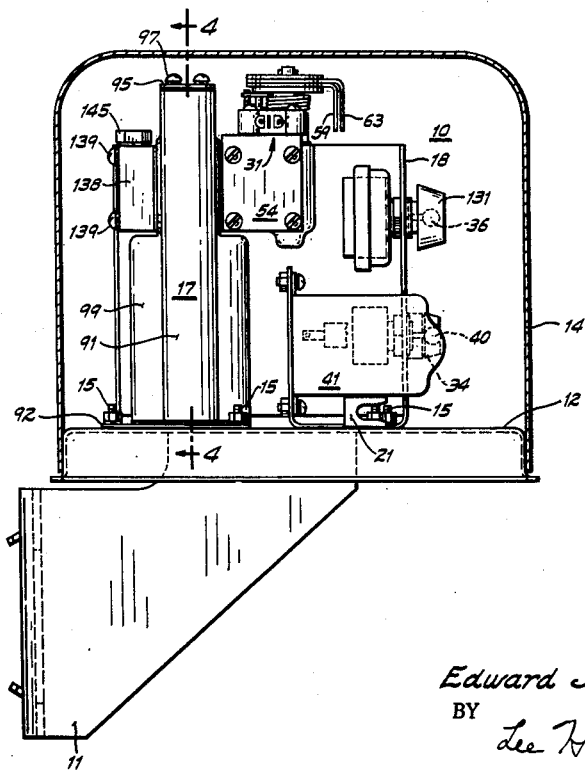
FIG. 1 is a vertical sectional view through voltage sensitive control apparatus embodying the invention.

When the load line voltage impressed on winding 101 over conductors 112 and 113 is at the midpoint of the voltage bandwidth, valve 155 is symmetrically disposed relative to delivery passages 147 and 148 and equal volumes of liquid are pumped to both ends of work cylinder 54 and piston 85 remains in its central position within work cylinder 54. Displacement of piston 85 away from its central position within work cylinder 54, i.e., from its neutral position, rotates bandwith adjusting plate 66 and depending pin 79 secured thereto to deflect one end 75 or 76 of spring 74 and thus stress, or load, spring 74 in proportion to the displacement of piston. Rotation of shaft 62 and lever arms 59 and 63 secured thereto through a sufficient angle operates either Raise contacts 30 or Lower contacts 31, and as explained hereinbefore the bandwidth adjusting levers 60 and 64 are adjustably secured to bandwidth adjusting plate 66 so that any desired rotation of shaft 62 from approximately 5° to 90° from its initial position can operate Raise contacts 30 or Lower contacts 31. It will be apparent that at the 90° setting shown in FIGS. 1, 3, and 10 when lever arms 59 and 63 are in the same radial plane, full voltage departure from the nominal value will be required to develop the torque necessary to stress torsion spring 74 sufficiently to deflect one end thereof through 90°, for example, to deflect end 76 through the ninety degrees required to operate Lower contacts 31 as illustrated in FIG. 10. It will also be appreciated that the voltage bandwith will be much wider at this ninety degree setting than at very low setting such as that illustrated in FIG. 11 wherein it is only necessary to displace piston 85 sufficiently from its central position within work cylinder 54 to rotate shaft 62 and lever arm 59 through approximately thirty degrees in order to operate Lower contacts 31.

The disclosed voltage sensitive control, including the electromagnetic vibratory pump and valving means combined with the work cylinder piston biased to neutral position by a double-acting torsion spring, provide excellent voltage departure integrating characteristics for the voltage regulating means. The work cylinder piston 85 does not instantaneously follow momentary or transient excursions of the load line voltage beyond the voltage bandwidth limits. Departure of load line voltage from the nominal value are summed up in displacement of valving piston 121 from the neutral position so that the disclosed apparatus integrates voltage departure from the nominal value as a function of both the magnitude of the departure from the nominal value and the time of such departure.

Means are provided to compensate for variations in resistance of the wire in coil 101, in the permeability of the electromagnetic material in the pole structure, and in the viscosity of the liquid 98 due to changes in temperature. Variation in ambient temperature may result in change in wire resistance and change in permeability which will raise or lower the magnetically suspended assembly including valving piston rod 121 from the mean position wherein valve 155 is symmetrically disposed relative to outlet passage 144 even though nominal voltage at the middle of voltage bandwidth is impressed upon winding 101. In accordance with the invention temperature responsive means are provided which vary the vertically upward forces suspending the assembly in accordance with temperature changes, whereby the unitary assembly occupies the mean position regardless of variations in magnetic flux in the pole structure incident to temperature variation. Mass 126 is partially suspended by bimetallic ambient temperature compensating springs 170 secured at one end by screws 171 to pump housing 91. Each bimetallic spring 170 has a hook portion 172 at its free end adapted to hold a wire loop 174 which extends through a hole adjacent the end of cross piece 127. The deflection of bimetallic temperature compensating members 170 due to temperature change is in a direction to return the unitary magnetically suspended assembly including valve 155 of valve rod 121 to its mean, or neutral, position despite changes of current through winding 101 or changes in magnetic flux in the pole structure resulting from ambient temperature variations.

While in the preferred embodiment the temperature compensating means exerts a vertically upward force on the assembly independent of the force resulting from the magnetic field, it will be appreciated that the compensating means may also vary the force resulting from the magnetic field in the proper direction to compensate for temperature variation. Temperature compensation, for example, can be accomplished by an impedance such as a potentiometer in series with the energizing winding 101 and temperature responsive means for moving the sliding contact of the potentiometer, or otherwise changing the impedance, in a direction to compensate for change in resistance of the wire in winding 101 or change in permeability of the pole structure steel with temperature. Such temperature compensating means directly change the magnitude of the magnetic flux in the pole structure rather than the additional upward force exerted on the unitary assembly as accomplished by the bimetallic springs 170 in the preferred embodiment.

While only a single embodiment of the invention has been illustrated and described, many modifications and variations thereof will be apparent to those skilled in the art, and consequently it is intended in the appended claims to cover all such modifications and variations which fall within the true spirit and scope of the invention.

What I claim as new and desire to secure by Letters Patent of the United States is:

1. In combination with an alternating current power source, a hydraulic work cylinder, a piston reciprocable within said work cylinder, an electromagnetic vibratory pump including an operating winding energized by the voltage from said alternating current power source and said pump being actuated by the cyclic variations of said voltage for pumping liquid into either end of said work cylinder in accordance with variations of said voltage above and below a predetermined value, said work cylinder being relatively large in comparison to said pump, whereby a time delay occurs in movement of said piston, voltage regulating means operated by movement of said piston in one direction from a central position in said work cylinder incident to departure of said voltage in one direction from said predetermined value to raise the voltage of said source and also operated by movement of said piston in the opposite direction from said central position incident to departure of said voltage in the opposite direction from said predetermined value to lower the voltage of said source, said voltage regulating means including means for resiliently biasing said piston against displacement from said central position and means for adjusting the magnitude of the departure of said voltage from said predetermined value required for said piston to operate said voltage regulating means, said piston assuming positions of equilibrium removed from said central position and wherein the force of the liquid delivered by said pump into said work cylinder is balanced by the force of said biasing means and the displacement of said piston from said central position integrating the departure of said voltage of said power source from said predetermined value with respect to both time and magnitude of said departure.

2. In combination, a hydraulic work cylinder, a piston reciprocable within said work cylinder, an electromagnetic vibratory pump including an operating winding adapted to be energized by the voltage from an alternating current power source and said pump being actuated by the cyclic variations of said voltage for pumping liquid into either end of said work cylinder in accordance with variations of said voltage above and below a predetermined value, voltage regulating means operated by movement of said piston in one direction from a central position in said work cylinder incident to departure of said voltage in one direction from said predetermined value to raise the voltage of said source and also operated by movement of said piston in the opposite direction from said central position incident to departure of said voltage in the opposite direction from said predetermined value to lower the voltage of said source, said voltage regulating means including means for resiliently biasing said piston against displacement from said central position and the displacement of said piston integrating the departure of said voltage of said power source from said predetermined value with respect to both time and magnitude of said departure, said predetermined value determining the midpoint of the voltage bandwidth within which the voltage is maintained by said voltage regulating means, means for adjusting the magnitude of the departure of said voltage from said predetermined value at the midpoint of said voltage bandwidth required for said piston to operate said voltage regulating means, and means including a variable impedance in series with said operating winding for adjusting the magnitude of said predetermined value.

3. In combination, a work cylinder, a piston in said work cylinder, an electromagnetic vibratory pump having an energizing winding and being actuated by the cyclic variations in an alternating current voltage impressed on said winding for selectively pumping liquid into either end of said cylinder in accordance with variations in the magnitude of said voltage above and below a predetermined value, resilient means for biasing said piston to a central position in said cylinder, said resilient means opposing displacement of said piston away from said central position with a force which increases in proportion to said displacement, first and second electrical switch means, and means operatively driven from said piston for selectively actuating said electrical switch means in accordance with the direction of displacement of said piston away from said central position.

4. In combination, a work cylinder, a piston in said work cylinder, an electromagnetic vibratory pump having an energizing winding and being actuated by the cyclic variations in an alternating current voltage impressed on said winding for selectively pumping liquid into either end of said cylinder in accordance with variations in the magnitude of said voltage above and below a predetermined value, resilient means for biasing said piston to a central position in said cylinder, said resilient means opposing displacement of said piston away from said central position with a force which increases in proportion to said displacement, first and second electrical switch means, means operatively driven from said piston for selectively actuating said electrical switch means in accordance with the direction of displacement of said piston away from said central position, and means for adjusting the volume of liquid flow from said pump into said cylinder.

5. In combination, a work cylinder, a piston in said work cylinder, an electromagnetic vibratory pump having an energizing winding and being actuated by the cyclic variations in an alternating current voltage impressed on said winding for selectively pumping liquid into either end of said cylinder in accordance with variations in the magnitude of said voltage above and below a predetermined value, resilient means for biasing said piston to a central position in said cylinder, said resilient means opposing displacement of said piston away from said central position with a force which increases in proportion to said displacement, first and second electrical switch means, means operatively driven from said piston for selectively actuating said electrical switch means in accordance with the direction of displacement of said piston away from said central position, means for adjusting the volume of liquid flow from said pump into said cylinder, and means for adjusting the displacement of said piston away from said central position required to operate said electrical switch means.

6. In combination, a work cylinder, a piston in said work cylinder, an electromagnetic vibratory pump having an energizing winding and being actuated by the cyclic variations in an alternating current voltage impressed on said winding for selectively pumping liquid into either end of said work cylinder and for selectively displacing said piston in opposite directions away from a central position within said work cylinder in accordance with the departures of said voltage above and below a predetermined value, first electrical switching means, second electrical switching means, means including a rack within said work cylinder secured to said piston and a pinion within said work cylinder meshing with said rack for selectively operating said first and second electrical switching means in accordance with the direction of displacement of said piston away from said central position, and means for adjusting the magnitude of the departure of said voltage from said predetermined value required for said piston to operate said electrical switching means.

7. In combination, a work cylinder, a piston in said work cylinder having ends spaced apart axially of said work cylinder, an electromagnetic vibratory pump having an energizing winding and being actuated by the cyclic variations in an alternating current voltage impressed on said winding for selectively pumping liquid into either end of said cylinder to selectively displace said piston in opposite directions away from a central position in said cylinder in accordance with variations in said voltage above and below a predetermined value, first and second electrical switching means, a rack within said cylinder affixed to said piston intermediate the ends thereof, a pinion within said cylinder meshing with said rack, a rotatably mounted shaft carrying said pinion and protruding exteriorly of said work cylinder, and means operatively connected to said shaft for selectively operating said electrical switching means in accordance with the direction of the displacement of said piston away from said central position in said cylinder.

8. In an alternating current electrical system, the combination of means for regulating the voltage of said system, a continuously operating electromagnetic motor energized continuously from said system and delivering energy due to the cyclic variations of said system, energy take-off mechanism operated by said motor, said motor selectively controlling the direction of energy take-off in accordance with departure of said voltage above and below a predetermined value, said voltage regulating means being selectively operated by said energy take-off mechanism to raise and lower the voltage of said system in accordance with the direction of energy take-off, said voltage regulating means including means for resiliently biasing said energy take-off means to a central position corresponding to said predetermined value and means for adjusting the magnitude of the departure of said voltage from said predetermined value required for said energy take-off mechanism to operate said voltage regulating means, said energy take-off means integrating the magnitude and time of the departure of said system voltage from said predetermined value.

9. In combination, a hydraulic work cylinder, a piston reciprocable within said cylinder, an electromagnetic vibratory pump including an operating winding adapted to be energized by an alternating current voltage, said pump being actuated by the cyclic variations of said voltage for pumping liquid into either end of said work cylinder and for selectively moving said piston in opposite directions from a central position in said work cylinder in accordance with departures of said voltage above and below a predetermined value, first electrical contact means operated upon movement of said piston in one direction from said central position in said work cylinder incident to departure of said voltage in one direction from said predetermined value, second electrical contact means operated upon movement of said piston in the opposite direction from said central position incident to departure of said voltage in the opposite direction from said predetermined value, and means for adjusting the magnitude of the departure of said voltage from said nominal value required for said piston to operate said electrical contact means.

10. In combination, a work cylinder, a piston in said work cylinder, an electromagnetic vibratory pump having an energizing winding and being actuated by the cyclic variations in an alterating current voltage impressed on said winding for selectively pumping liquid into either end of said work cylinder and for selectively displacing said piston in opposite directons away from a central position within said work cylinder in accordance with the departures of said voltage above and below a predetermined value, first electrical switching means, second electrical switching means, and means including a rack within said work cylinder secured to said piston and a pinion within said work cylinder meshing with said rack for selectively operating said first and second electrical switching means in accordance with the direction of displacement of said piston away from said central position.

11. In combination, a work cylinder, a piston in said work cylinder having ends spaced apart axially of said work cylinder, an electromagnetic vibratory pump having an energizing winding and being actuated by the cyclic variations in an alternating current voltage impressed on said winding for selectively pumping liquid into either end of said cylinder in accordance with variations in said voltage above and below a predetermined value, resilient means for biasing said piston to a central position in said work cylinder, said resilient means opposing displacement of said piston away from said central position with a force which increases in proportion to said displacement, a rack within said cylinder secured to said piston intermediate the ends thereof, a pinion within said cylinder meshing with said rack, a rotatably mounted shaft carrying said pinion and protruding exteriorly of said work cylinder, first and second electrical switch means, said shaft having an initial position corresponding to the central position of said piston within said cylinder, and means secured to said shaft for selectively operating said first and second electrical switch means in accordance with the direction of rotation of said shaft from said initial position.

12. In combination, a work cylinder, a piston in said work cylinder having ends spaced apart axially of said work cylinder, an electromagnetic vibratory pump having an energizing winding and being actuated by the cyclic variations in an alternating current voltage impressed on said winding for selectively pumping liquid into either end of said cylinder in accordance with variations in said voltage above and below a predetermined value, resilient means for biasing said piston to a central position in said work cylinder, said resilient means opposing displacement of said piston away from said central position with a force which increases in proportion to said displacement, a rack within said cylinder secured to said piston intermediate the ends thereof, a pinion within said cylinder meshing with said rack, a rotatably mounted shaft carrying said pinion and protruding exteriorly of said work cylinder, first and second electrical switch means, said shaft having an initial position corresponding to the central position of said piston within said cylinder, means secured to said shaft for selectively operating said first and second electrical switch means in accordance with the direction of rotation of said shaft from said initial position, and means for adjusting the angular rotation of said shaft away from said initial position required to operate said electrical switch means.

13. In combination, a work cylinder, a piston in said work cylinder having ends spaced apart axially of said cylinder, an electromagnetic vibratory pump having an energizing winding and being actuated by the cyclic vibrations in an alternating current voltage impressed on and winding for selectively pumping liquid into either end of said cylinder in accordance with variations in said voltage above and below a predetermined value, a rack within said work cylinder secured to said piston intermediate the ends thereof, a pinion within said cylinder meshing with said rack, a rotatably mounted shaft carrying said pinion and protruding exteriorly of said work cylinder, means including a torsion spring having radially extending ends and surrounding said shaft and a member secured to said shaft and displosed between said spring ends for biasing said piston to a central position within said cylinder, first and second electrical switching means, said shaft having an initial position corresponding to the central position of said piston within said cylinder, and means secured to said shaft for selectively operating said first and second switching means in accordance with the direction of rotation of said shaft away from said initial position.

14. In combination, a work cylinder, a piston in said work cylinder having ends spaced apart axially of said cylinder, an electromagnetic vibratory pump having an energizing winding and being actuated by the cyclic vibrations in an alternating current voltage impressed on said winding for selectively pumping liquid into either end of said cylinder in accordance with variations in said voltage above and below a predetermined value, a rack within said work cylinder secured to said piston intermediate the ends thereof, a pinion within said cylinder meshing with said rack, a rotatably mounted shaft carrying said pinion and protruding exteriorly of said work cylinder, means including a torsion spring having radially extending ends and surrounding said shaft and a member secured to said shaft and disposed between said spring ends for biasing said piston to a central position within said cylinder, first and second electrical switching means, said shaft having an initial position corresponding to the central position of said piston within said cylnder, means secured to said shaft for selectively operating said first and second switching means in accordance with the direction of rotation of said shaft away from said initial position, means for controlling the volume of liquid pumped by said vibratory pump into said work cylinder, and means for adjustably securing said switch operating means at different angular positions relative to said shaft.

15. An electromagnetic voltage sensitive control comprising a field structure, a winding on said field structure, an armature suspended magnetically within said field structure in a mean position determined by the magnitude of the magnetic flux in said field structure and being arranged to vibrate about said means position in accordance with the fluctuations in magnetic flux in said field structure incident to an alternating current voltage being impressed on said winding, a body portion rigid with said field structure and defining a pumping chamber, said pump also including a movable pumping member driven from another armature, a work cylinder, a double-ended piston within said work cylinder having ends spaced apart axially of said work cylinder, a rack within said work cylinder rigid with said piston between the ends thereof, a pinion within said work cylinder meshing with said rack, a rotatably mounted shaft carrying said pinion and protruding exteriorly of said work cylinder, and means including a torsion spring operatively connected to said shaft for biasing said piston to a central position within said work cylinder, first and second electrical switching means, means secured to said shaft for selectively operating said first and second switching means in accordance with the direction of rotation of said shaft from an initial position corresponding to said central position of said piston, said pump also including direction-controlling valve means operatively connected to said armature for selectively directing the liquid from said pump into opposite ends of said work cylinder in accordance with the mean position of said armature.

16. A voltage sensitive control comprising a pole structure, an energizing winding on said pole structure, an armature suspended magnetically within said pole structure and arranged to vibrate due to the cyclic variations of an alternating current voltage impressed on said winding, a body portion rigid with said pole structure and having an open-ended central cylinder therein provided with inlet and outlet passages, inlet and outlet valves in said passages, a pumping piston rod in the lower end of said vertical cylinder rigid with said armature, a valving piston rod in the upper end of said vertical cylinder defining a pumping chamber together with said pumping piston rod, said outlet passage connecting said pumping chamber with a portion of said vertical cylinder axially spaced from said pumping chamber, a work cylinder rigid with said body portion, said body portion having delivery passages registering with said cylinder on opposite sides of said outlet passage and communicating with opposite ends of said work cylinder, means for resiliently connecting said pumping piston rod to said valving piston rod, said pumping piston rod, said valving piston rod and said resilient connecting means constituting a unitary assembly adopted to occupy a mean position determined by the alternating current voltage impressed on said winding and assuming positions on opposite sides of said means position in accordance with variations in said voltage, a weight of sufficient mass connected to said valving piston rod to prevent vibration thereof in response to the fluctuations of magnetic flux in said pole structure, and valve means carried by said valving rod for selectively connecting said outlet passage with said delivery passages in accordance with said mean position of said assembly.

17. A voltage sensitive control comprising a pole structure, an energizing winding on said pole structure, an armature suspended magnetically within said pole structure and arranged to vibrate due to the cyclic variations of an alternating current voltage impressed on said winding, a body portion rigid with said pole structure and having an open-ended vertical cylinder therein provided with inlet and outlet passages, inlet and outlet valves in said passages, a pumping piston rod in the lower end of said vertical cylinder rigid with said armature, a valving piston rod in the upper end of said vertical cylinder defining a pumping chamber together with said pumping piston rod, said outlet passage connecting said pumping chamber with a portion of said vertical cylinder axially spaced from said pumping chamber, a work cylinder rigid with said body portion, said body portion having delivery passages registering with said cylinder on opposite sides of said outlet passage and communicating with opposite ends of said work cylinder, means for resiliently connecting said pumping piston rod to said valving piston rod, said pumping piston rod, said valving piston rod and said resilient connecting means constituting a unitary assembly adopted to occupy a mean position determined by the alternating current voltage impressed on said winding and assuming positions on opposite sides of said mean position in accordance with variations in said voltage, a weight of sufficient mass connected to said valving piston rod to prevent vibration thereof in response to the fluctuations of magnetic flux in said pole structure, valve means carried by said valving rod for selectively connecting said outlet passage with said delivery passages in accordance with said mean position of said assembly, and temperature responsive means for varying the vertically upwardly directed forces suspending said unitary assembly in accordance with temperature variation, whereby said unitary assembly occupies said mean position regardless of variations in magnetic flux in said pole structure incident to temperature variation.

18. In an alternating current electric system, means for regulating the voltage of said system, said regulating means including first and second electrical switch means and being adapted when said first electrical switch means is operated to raise the voltage of said system and when said second electrical switch means is operated to lower the voltage of said system, a work cylinder, a piston reciprocable within said work cylinder, an electromagnetic pump having an operating winding energized by the voltage from said system and being relatively small in comparison to said work cylinder and being actuated by the cyclic variations in the alternating current for selectively pumping liquid into either end of said work cylinder to selectively displace said piston in opposite directions away from a central position within said work cylinder in accordance with the departures of said system voltage above and below a predetermined value, means operatively connected to said piston and resiliently biasing said piston against displacement from said central position for operating said first electrical switch means when said piston is displaced in one direction away from said central position and to operate said second electrical switch means when said piston is displaced the opposite direction away from said central position, the displacement of said piston from said central position integrating the magnitude and time of the departure of said system voltage from said predetermined value and the voltage bandwidth within which the system voltage is maintained by said regulating means being equal to twice the departure in the magnitude of said system voltage from said predetermined value required to displace said piston sufficiently from said central position to operate said electrical switch means, and means for adjusting said voltage bandwidth.

19. A vibratory alternating current electromagnetic pump comprising a pole structure, an energizing winding on said pole structure, an armature suspended magnetically within said pole structure and arranged to vibrate due to the cyclic variations of the alternating current impressed on said winding, a body portion rigid with said pole structure and having a vertical cylinder therein and also having outlet and inlet passages registering with said cylinder, inlet and outlet valves in said passages, first and second piston rods positioned within said cylinder and defining a pumping chamber therebetween, said first piston rod being rigid with said armature, resilient connecting means between said piston rods, a weight secured to said second piston rods and having sufficient mass to prevent said second piston rod from vibrating, said first and second piston rods and said weight and said connecting means constituting a unitary assembly adapted to occupy a mean position determined by the alternating current voltage impressed on said winding and said armature and said first piston rod being arranged to vibrate about said mean position and to cause pumping independently of said mean position, direction controlling valve means secured to said second piston rod for controlling the direction of flow of liquid from said outlet passage in accordance with the mean position of said assembly, and temperature responsive means for varying the vertical forces acting on said unitary assembly in accordance with temperature variation, whereby said unitary assembly occupies said mean position regardless of variations in magnetic flux in said pole structure incident to temperature variation.

20. In combination, an electromagnetic vibratory pump including a field structure, a winding on said field structure, and an armature within said field structure arranged to vibrate due to the cyclic variations of magnetic flux within said field structure, said pump being responsive to the vibrations of said armature for energy delivery, valve means operatively connected to said armature and together with said armature constituting a unitary assembly magnetically suspended within said field structure in a mean position determined by the magnitude of magnetic flux in said pole structure and said valve means selectively controlling the direction of energy take-off from said pump in accordance with said mean position of said unitary assembly, and temperature responsive means for varying the vertical forces acting on said unitary assembly in accordance with temperature variation.

21. In combination, a hydraulic work cylinder, a piston reciprocable within said work cylinder, an electromagnetic vibratory pump including an operating winding adapted to be energized by an alternating current voltage, said pump being actuated by the cyclic variations of said voltage for pumping liquid with either end of said cylinder in accordance with departures of said voltage above and below a predetermined value, first and second electrical switching means, means operatively connected to said piston for selectively operating said first and second switching means in accordance with the direction of displacement of said piston from a central position in said cylinder, and means for adjusting the time, after said voltage departs from said predetermined value, required for said pump to displace said piston sufficiently to effect operation of said electrical switching means.

22. In combination, a work cylinder, a piston within said work cylinder, a body portion rigid with said work cylinder and having a vertical cylinder therein, a pole structure rigid with said body portion, a winding on said pole structure, an armature within said pole structure, opposed piston rods within said vertical cylinder defining a pumping chamber therebetween, means for resiliently connecting said piston rods, one of said piston rods being rigid with said armature, said piston rods constituting a unitary assembly magnetically suspended in said pole structure in a mean position determined by the magnitude of the magnetic flux in said pole structure and said armature and said one piston rod being adapted to vibrate about said mean position in response to the cyclic variations of magnetic flux in said pole structure incident to an alternating current voltage being impressed on said winding, a weight of sufficient mass secured to said other piston rod to keep it from vibrating, said other piston rod carrying valve means for selectively delivering liquid from said pumping chamber into opposite ends of said work cylinder in accordance with said mean position of said unitary assembly, and bimetallic spring means rigidly mounted at one end and secured at the other end to said unitary assembly and normally exerting a vertically upward force on said unitary assembly for varying the upwardly directed forces on said unitary assembly in accordance with temperature variations.

23. In combination, a sealed hollow housing defining a work cylinder and a vertical cylinder, liquid within said housing, a pole structure within said housing, an energizing winding on said pole structure, an armature within said pole structure, a piston rod rigidly secured to said armature and disposed within the lower portion of said vertical cylinder, a valving piston rod within the upper portion of said vertical cylinder and together with said pumping piston rod defining a pumping chamber therebetween, a U-shaped weight connected to said valving rod, a resonant leaf spring connected at its midportion to said armature and secured at its ends to said U-shaped weight, said valving rod and said pumping rod and said weight constituting a unitary assembly adapted to be magnetically suspended within said pole structure in a mean position determined by the magnetic flux in said pole structure and said armature and said pumping piston rod being arranged to vibrate about said mean position in accordance with the cyclic variations of magnetic flux in said pole structure, said housing having inlet and outlet passages communicating at one end with said pumping chamber, the other end of said inlet passage communicating with said liquid and the other end of said outlet passage registering with said vertical cylinder at a position spaced axially from said pumping chamber, inlet and outlet valves in said inlet and outlet passages, a piston in said work cylinder, said weight being of sufficient mass to prevent vibration of said valving piston rod, valve means rigid with said valving piston rod for selectively connecting said delivery passages with said outlet passage in accordance with said mean position, first and second electrical switching means, means including a torsion spring for resiliently biasing said piston to a central position within said work cylinder, and means operatively connected to said piston for selectively operating said first and second electrical switching means in accordance with the direction of displacement of said piston away from said central position.

24. In combination, a pole structure, an energizing winding on said pole structure, an armature within said pole structure, a body portion rigid within said pole structure and having a vertical cylinder therein provided with inlet and outlet passages, inlet and outlet valves in said passages, opposed piston rods within said cylinder defining a pumping chamber therebetween registering with said inlet and outlet passages, the first of said piston rods being rigid with said armature, a weight secured to the second piston rod, means for resiliently connecting said first and second piston rods, said piston rods and said weight constituting a unitary assembly adapted to be magnetically suspended within said pole structure in a mean position determined by the magnitude of the magnetic flux in said pole structure and said armature and said first piston rod being arranged to vibrate about said mean position in response to the cyclic fluctuations of magnetic flux in said pole structure, said weight being of sufficient mass to prevent vibration of said second piston rod, a work cylinder rigid with said body portion, a piston within said work cylinder, valve means carried by said second piston rod for selectively directing liquid from said outlet passage into opposite ends of said work cylinder and for selectively displacing said piston in opposite directions away from a central position in said work cylinder in accordance with said means position, first and second electrical switching means, a rotatably mounted shaft, means within said work cylinder for converting displacement of said piston into rotation of said shaft, said shaft having an initial position corresponding to said central position of said piston within said work cylinder, and means secured to said shaft for selectively operating said first and second electrical switching means in accordance with the direction of rotation of said shaft away from said initial position.

25. A voltage sensitive control comprising a pole structure, an energizing winding on said pole structure, an armature magnetically suspended in said pole structure and arranged to vibrate due to the cyclic variations of alternating current impressed on said winding, a body portion rigid with said pole structure and having a vertical cylinder therein and inlet and outlet passages registering with said cylinder inlet and outlet valves for said passages, a pumping piston rod rigid with said armature and reciprocable within said cylinder, a valving piston rod within said cylinder and together with said pumping piston rod defining a pumping chamber therebetween, resilient means connecting said pumping piston rod and said valving piston rod, a weight connected to said valving piston rod and being of sufficient mass to prevent vibration thereof in response to the cyclic pulsations of said armature, said pumping piston rod and said valving piston rod and said weight and said connecting means constituting a unitary assembly adapted to occupy a mean position determined by the alternating current voltage impressed on said winding, a work cylinder, a double-ended piston within said work cylinder having ends spaced apart axially of said work cylinder, a shaft rotatably journalled within said work cylinder between the ends of said piston and protruding exteriorly of said work cylinder, a rack within said work cylinder rigid with piston between the ends thereof, a pinion carried by said shaft within said work cylinder and meshing with said rack, resilient means connected to said shaft for normally biasing said piston to a central position within said work cylinder, said valving piston rod carrying direction controlling valve means for selectively directing the fluid from said outlet passage into opposite ends of said work cylinder in accordance with the mean position of said unitary assembly.

26. In combination, a sealed, hollow housing having therein a vertical cylinder and a vertically extending cylindrical compartment coaxial with said vertical cylinder and a work cylinder, liquid within said housing, opposed first and second piston rods within said vertical cylinder defining a pumping chamber therebetween, a piston reciprocable within said work cylinder, said housing also having an inlet passage communicating with said liquid within said housing and registering with said pumping chamber, an outlet passage registering at one end with said pumping chamber and at the opposite end with an intermediate portion of said vertical cylinder, inlet and outlet valves in said inlet and outlet passages, said housing having delivery passages registering with said vertical cylinder above and below said opposite end of said outlet passage and communicating with opposite ends of said work cylinder, means within said housing for resiliently connecting said opposed piston rods, a weight within said housing connected to the first of said piston rods, a field structure within said compartment, an energizing winding on said field structure, an armature within said field structure connected to said second piston rod, said armature, said piston rods, said weight, and said resilient connecting means constituting a unitary assembly adapted to be magnetically suspended within said field structure in a mean position determined by the magnitude of the magnetic flux in said pole structure and said armature and said second piston rod being adapted to vibrate about said mean position in response to the cyclic variations of the magnetic flux in said field structure, said weight being of sufficient mass to prevent vibration of said first piston rod, said first piston rod carrying first valve means for selectively connecting said delivery passages with said outlet passage in accordance with said mean position, said housing also having exhaust passages registering with said vertical cylinder and communicating with the liquid within said housing, said second piston rod carrying second valve means for selectively connecting said delivery passages with said exhaust passages in accordance with said mean position.

27. In combination, a hydraulic work cylinder, a piston in said work cylinder having ends spaced apart axially of said work cylinder, an electromagnetic vibratory pump including an energizing winding and being actuated by the cyclic variations of alternating currrent voltage impressed on said winding for pumping liquid into either end of said work cylinder in accordance with variations of said voltage above and below a predetermined value, a rack within said work cylinder secured to said piston between the ends thereof, a pinion within said work cylinder meshing with said rack, a shaft rotatably mounted on said work cylinder and carrying said pinion, first and second electrical switching means mounted on opposite sides of said shaft, a disk secured to said shaft for rotation therewith, means carried by said disk for operating said first switching means, means carried by said disk for operating said second switching means, a torsion spring surrounding said shaft and having radially extending ends in approximately the same radial plane, a rigidly mounted stop pin disposed between said radially extending ends of said spring, a pin carried by said disk and disposed between said radially extending ends of said spring, said spring cooperating with both said stop pin and said pin carried by said disk to bias said piston to a central position within said work cylinder, and means for adjustably securing said switch operating means to said disk at positions varying angularly relative to said disk, whereby the bandwidth of voltage regulating apparatus controlled by said first and second switching means may be adjusted.

References Cited in the file of this patent

UNITED STATES PATENTS

| | | |
|---|---|---|
| 2,627,811 | Van Ryan | Feb. 10, 1953 |
| 2,676,462 | Berry | Aug. 27, 1954 |
| 2,682,748 | Ernst | July 6, 1954 |
| 2,685,838 | Weinfurt | Aug. 10, 1954 |
| 2,721,969 | Van Ryan et al. | Oct. 25, 1955 |
| 2,767,369 | Schindler | Oct. 16, 1956 |
| 2,784,368 | Sealey | Mar. 5, 1957 |
| 2,861,144 | Faure | Nov. 18, 1958 |
| 2,911,492 | Beatty | Nov. 3, 1959 |